Figure 1:
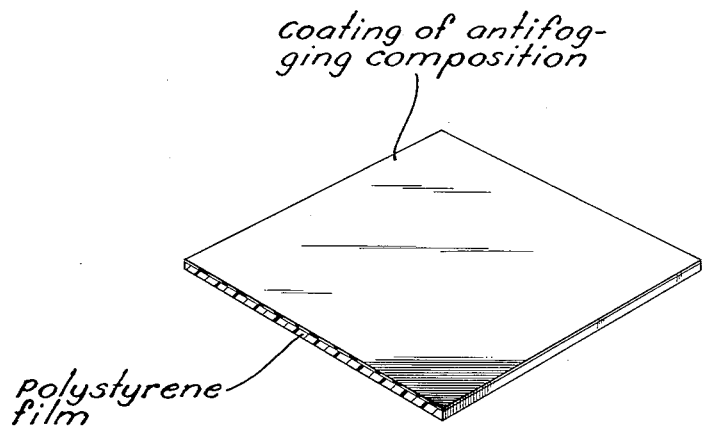

Feb. 20, 1962 W. R. R. PARK ETAL 3,022,178
ANTI-FOGGING COMPOSITION FOR POLYSTYRENE FILM
AND COATED PRODUCT
Filed Jan. 11, 1960

INVENTORS.
William R. R. Park
Richard L. Hill
BY Griswold & Burdick
ATTORNEYS

United States Patent Office 3,022,178
Patented Feb. 20, 1962

3,022,178
ANTI-FOGGING COMPOSITION FOR POLYSTYRENE FILM AND COATED PRODUCT
William R. R. Park and Richard L. Hill, Midland, Mich., assignors to The Dow Chemical Company, Midland, Mich., a corporation of Delaware
Filed Jan. 11, 1960, Ser. No. 1,551
6 Claims. (Cl. 106—13)

This invention relates to anti-fogging compositions for polystyrene film and sheet and pertains to articles of manufacture comprising a styrene polymer film or sheet having on at least one of its surfaces a coating of the anti-fogging composition.

Polystyrene, because of its transparency and clarity, has potential uses in the field of packaging, particularly in uses where articles are packaged in containers having a transparent window for viewing of the packaged article while at the same time protecting it from dust or contamination. However, the tendency of polystyrene film or sheet toward fogging when exposed to high humidity conditions by the condensing of moisture in the form of small individual droplets on the surface of the film or sheet not only is unsightly, but renders the film opaque in appearance.

It is a principal object of the invention to provide an anti-fogging composition that will maintain polystyrene sheet or film transparent under exposure to high humidity conditions and which is effective for long periods of time. Another object is to provide new articles of manufacture comprising a polystyrene film or sheet structure having on at least one of its surfaces, preferably on each of its major surfaces, an anti-fogging composition capable of maintaining the polystyrene in a visually transparent condition under high humidity conditions.

According to the invention an anti-fogging composition capable of maintaining polystyrene film and sheet transparent under conditions of high humidity is readily prepared by intimately incorporating with one another to form a homogeneous composition, a mixture of surface active agents consisting essentially of an alkylphenyl polyethylene glycol ether containing from about 3 to 11 oxyethylene groups in the molecule, and an alkali metal salt of a fatty alcohol sulfate containing from 8 to 18 carbon atoms in the molecule. Best results are usually obtained by including in the composition from 10 to 20 percent by weight, based on the sum of the weights of the alkylphenyl polyethylene glycol ether and the alkali metal fatty alcohol sulfate, of a finely divided inert material such as silica, starch or talc to inhibit tack and improve the slip characteristics of the coated film or sheet.

The alkylphenyl polyethylene glycol ethers to be employed in preparing the anti-fogging compositions of the invention are water soluble surfactants having the general formula:

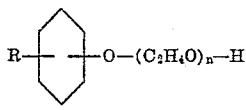

wherein R represents an alkyl radical containing from 8 to 9 carbon atoms and $n$ is an integer from 3 to 11. Examples of suitable alkylphenyl polyethylene glycol ethers are the alkylphenyl ethers of polyethylene glycols containing from 3 to 11 oxyethylene groups in the molecule. Such ethers are prepared by reaction of alkylphenols such as isooctylphenol and nonylphenol with ethylene oxide. Such compounds are commonly known as surfactants and are available commercially.

The alkali metal alkyl alcohol sulfates to be employed can be a sodium or potassium derivative of a sulfated alkyl alcohol containing from 8 to 18 carbon atoms in the molecule. Examples of suitable alkyl alcohol sulfates are sodium 2-ethylhexyl sulfate, sodium lauryl sulfate, potassium lauryl sulfate, sodium 7-ethyl-2-methyl undecyl sulfate, sodium dodecyl sulfate, potassium dodecyl sulfate, sodium 3,9-diethyl-tridecyl sulfate, potassium 3,9-diethyltridecyl sulfate and sodium oleyl sulfate. Such alkali metal alkyl sulfates are commonly known surfactants and are available commercially.

It is important that the surface active agents, namely, the alkylphenyl polyethylene glycol ether and the alkali metal alkyl sulfate, be employed in combination and in proportions corresponding to from about 50 to 90 percent by weight of the alkylphenyl polyethylene glycol ether and from 50 to 10 percent by weight of the alkali metal alkyl sulfate, and as previously stated, advantageously with from about 10 to 20 percent by weight, based on the sum of the weights of the surfactants, of a finely divided inert material such as silica, starch or talc, preferably the latter, in order to obtain compositions which are capable of maintaining polystyrene film and sheet in a visually transparent condition under conditions of high humidity and at the same time provide a non-tacky or non-blocking coating on the surface of the film or sheet and so that the coated sheets or films possess improved slip characteristics.

The anti-fogging compositions are prepared by intimately incorporating the ingredients with one another to form a homogeneous composition which is then applied to the surfaces of the polystyrene film or sheet to produce the new articles of manufacture of the invention, namely the polystyrene film or sheet structure having on its surfaces a continuous coating of the anti-fogging composition. The proportion of the composition to be applied to the surfaces of the polystyrene sheet or film to inhibit or prevent fogging of the structure need be only an amount of the composition sufficient to form a continuous monomolecular layer of the mixture of the surface active agents on the surfaces of the film or sheet. In its practical application somewhat greater proportions of the composition, usually an amount of the composition sufficient to form a coating or continuous layer of the mixture of the surfactants which is at least 50 Angstroms thick, or between 50 and 500 preferably from 100–300 Angstroms thick.

The ingredients of the anti-fogging composition are conveniently mixed with one another by dissolving or dispersing them in a liquid medium such as water, lower aliphatic alcohols or a mixture of water and a lower alkyl alcohol such as methanol, ethanol, isopropanol, n-propanol or tert.-butyl alcohol, which liquid medium is a non-solvent for the polystyrene.

Since only small proportions of the composition are required to produce a continuous coating or layer of the composition on the surfaces of the film or sheet and are effective in maintaining the polystyrene transparent, the ingredients of the composition are mixed together in the liquid medium in the desired proportions in a total concentration of at least 0.1 percent, suitably from 0.1 to 10 percent by weight of the liquid dispersion or solution. Such dispersion or solution of the ingredients of the anti-fogging composition is applied to the surfaces of the polystyrene sheet or film by brushing, dipping, spraying, roller coating or by doctor blades, and when applied as a wet layer of the dispersion or solution having a thickness of from about 0.1 to 1 mil, then dried, usually results in a continuous coating of from about 50 to 500 A. thick of the anti-fogging composition on the treated surfaces of the polystyrene film or sheet.

The coated films and sheet of the invention are useful for a variety of purposes in the home and industry such as packaging articles in cardboard boxes having viewing windows therein, as substitutes for glass window panes, or for packaging comestibles.

The following examples illustrate ways in which the principle of the invention has been applied, but are not to be construed as limiting its scope.

EXAMPLE 1

Figure 2:
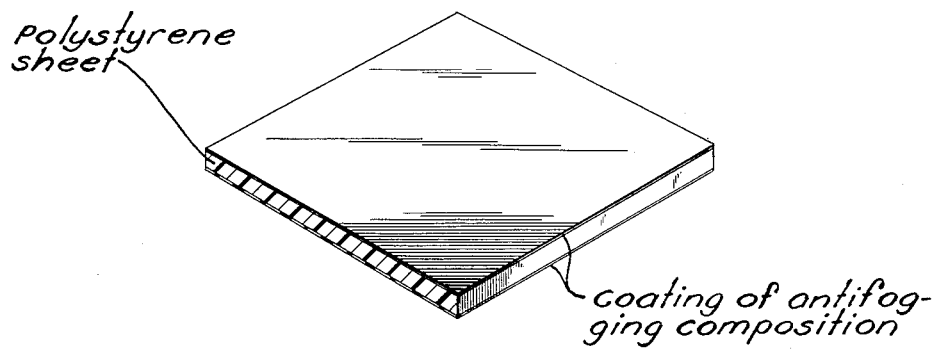

A composition was prepared by mixing together (a) 16.5 parts by weight of a 50 weight percent solution of Triton X–100 (isooctyl phenoxy polyethoxyl ethanol) in ethyl alcohol, (b) 12.5 parts by weight of a 25 percent aqueous solution of Tergitol 4, (sodium sulfate derivative of 7-ethyl-2-methyl undecanol-4), (c) 3.9 parts by weight of an aqueous 40 weight percent dispersion of talc, and (d) 6600 ml. of deionized water. The talc dispersion employed in preparing the composition was prepared by mixing 40 parts by weight of talc of particles of sizes passing through a 325 mesh per inch U.S. standard screen with 60 parts by weight of an aqueous solution containing 2 parts by weight of Pluronic L64 (a polyoxypropylene polyoxyethylene condenaste non-ionic surfactant) and 5 parts by weight of an aqueous 10 weight percent solution of ammonium hydroxide, and ball-milling the mixture at room temperature for a period of 72 hours. The composition consisting of the aqueous solution of the surface active ingredients having the finely divided talc uniformly dispersed throughout was applied to one surface of a polystyrene film 1 mil thick by means of a No. 8 Mayer rod to form a wet layer approximately ¼ mil thick and was dried at 80° C. for 2 minutes to form a coating of the composition approximately 100 A. thick. Portions of the coated polystyrene film were tested for fogging by securing the film, coated side down, with a rubber band over the top of a 32 ounce glass jar containing about 6 ounces of water at 25° C. The jar was placed in a refrigerator for two minutes, then was removed and examined for fogging. The coated film remained clear and transparent after repeated tests for fogging. In contrast, untreated polystyrene film when tested in the same manner was foggy after only a few seconds in the refrigerator. Other portions of the coated polystyrene film were tested for slip characteristics by measuring the co-efficient of friction between surfaces of the coated polystyrene film under a loading of 100 grams per square inch and a speed of 6 inches per minute. In such test the coated polystyrene film had a co-efficient of friction of 0.30, whereas uncoated polystyrene had a co-efficient of friction of 0.57. Similar results were obtained by coating both sides of a polystyrene film 1 mil thick with the anti-fogging composition. FIG. 1 of the drawing illustrates in an enlarged view the new article of manufacture comprising the polystyrene film structure having the coating of the anti-fogging composition on one surface of the film. FIG. 2 of the drawing illustrates the polystyrene structure in an enlarged view having both surfaces coated with the anti-fogging composition.

EXAMPLE 2

In each of a series of experiments, an isooctylphenyl polyethylene glycol ether containing oxyethylene groups in the molecule in number corresponding approximately to that given in the following table, together with Tergitol 4 (sodium sulfate derivative of 7-ethyl-2-methyl undecanol-4), in proportions as stated in the table were dissolved in water to form an aqueous solution containing said mixture of surfactants in a total concentration as stated in the table. A portion of the solution was coated onto one surface of a polystyrene film 1 mil thick by means of a No. 8 Mayer rod to form a continuous layer of the solution about ¼ mil thick. The layer was dried by heating in an air oven at 80° C. for two minutes. The dried coating was approximately 100 Angstroms thick. Portions of the coated film were tested for fogging employing procedure similar to that employed in Example 1. Table I identifies the experiments and gives the amounts of the issoctylphenyl polyethylene glycol ether, together with the approximate number of oxyethylene groups in the molecule, and the sodium sulfate derivative of 7-ethyl-2-methyl undecanol-4 employed in preparing the composition. The table also gives the fogging characteristic observed for the coated polystyrene film.

*Table I*

| Run No. | Starting Materials | | | | | Coated Film Fogging Test— Remarks |
|---|---|---|---|---|---|---|
| | Isooctylphenyl Polyethylene Glycol Ether | | Sodium Alkyl Sulfate, gm. | Water, gm. | Solution Conc., Percent | |
| | gm. | Oxyethylene Groups, No. | | | | |
| 1 | 1.6 | 5 | 0.4 | 1,000 | 0.2 | Clear, transparent, no fogging. |
| 2 | 0.9 | 9–10 | 0.1 | 1,000 | 0.1 | Do. |
| 3 | 1.0 | 7–8 | 1.0 | 1,000 | 0.2 | Do. |
| 4 | 1.6 | 9–19 | 0.4 | 1,000 | 0.2 | Do. |
| 5 | 1.6 | 16 | 0.4 | 1,000 | 0.2 | fogging, cloudy. |

Similar results are obtained when sodium lauryl sulfate, sodium oleyl sulfate, sodium heptadecyl sulfate or sodium 2-ethylhexyl sulfate are substituted for the sodium 7-ethyl-2-methyl undecyl sulfate used in the experiments.

EXAMPLE 3

In each of a series of experiments, a nonylphenyl polyethylene glycol ether containing oxyethylene groups in the molecule in number corresponding approximately to that given in the following table, together with Tergitol 4 (sodium sulfate derivative of 7-ethyl-2-methyl undecanol), in amounts as stated in the table, were dissolved in water to form an aqueous solution containing the mixture of the surface active agents in a total concentration of 0.2 percent by weight of the solution. A portion of the solution was coated onto one side of a 1 mil thick polystyrene film to form a continuous layer by a means of a No. 8 Mayer rod. The layer was dried by placing the coated film in an air oven at 80° C. for two minutes.

The coated film was tested for fogging employing procedure similar to that described in Example 1. Table II identifies the experiments and gives the amounts of the ingredients used in making the coating composition. The table also gives the fogging characteristic observed for the coated polystyrene film.

*Table II*

| Run No. | Starting Materials | | | | | Coated Film Fogging Test— Remarks |
|---|---|---|---|---|---|---|
| | Nonylphenyl Polyethylene Glycol Ether | | Sodium Alkyl Sulfate, gm. | Water, gm. | Solution Conc., Percent | |
| | gm. | Oxyethylene Groups, No. | | | | |
| 1 | 1.6 | 3–4 | 0.4 | 1,000 | 0.2 | Clear, transparent, no fogging. |
| 2 | 1.6 | 5–6 | 0.4 | 1,000 | 0.2 | Do. |
| 3 | 1.6 | 7–8 | 0.4 | 1,000 | 0.2 | Do. |
| 4 | 1.6 | 8–9 | 0.4 | 1,000 | 0.2 | Do. |
| 5 | 1.6 | 12 | 0.4 | 1,000 | 0.2 | foggy, cloudy. |

We claim:

1. An anti-fogging composition consisting essentially of an intimate mixture of from 50 to 90 percent by weight of a non-ionic surfactant which is an alkylphenyl polyethylene glycol ether having the general formula

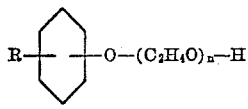

wherein R represents an alkyl radical containing from 8 to 9 carbon atoms, and $n$ is an integer from 3 to 11, and from 50 to 10 percent by weight of an alkali metal alkyl sulfate containing from 8 to 18 carbon atoms in the molecule, the percent by weight being based on the total weight of the alkylphenyl polyethylene glycol ether and the alkali metal alkyl sulfate.

2. A composition as claimed in claim 1, wherein the alkylphenyl polyethylene glycol ether is an isooctylphenyl ether of a polyethylene glycol containing from 3 to 11 oxyethylene groups in the molecule.

3. A composition as claimed in claim 1, wherein the alkali metal alkyl sulfate is the sodium sulfate derivative of 7-ethyl-2-methyl undecanol.

4. An anti-fogging composition consisting essentially of an intimate mixture of from 50 to 90 percent by weight of an isooctylphenyl ether of a polyethylene glycol containing from 9 to 10 oxyethylene groups in the molecule and from 50 to 10 percent by weight of a sodium alkyl sulfate consisting essentially of the sodium sulfate derivative of 7-ethyl-2-methyl undecanol and from 10 to 20 percent by weight of finely divided talc, based on the sum of the weights of the isooctylphenyl ether and the sodium alkyl sulfate, the percent by weight being based on the total weight of the alkylphenyl polyethylene glycol ether and the alkali metal alkyl sulfate.

5. An article of manufacture comprising anti-fogging films and sheets of polystyrene consisting of the polystyrene structure having a coating on at least one of its major surfaces of a continuous layer of a mixture consisting essentially of from 50 to 90 percent by weight of an alkylphenyl polyethylene glycol ether having the general formula

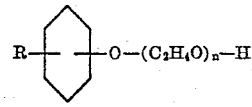

wherein R represents an alkyl radical containing from 8 to 9 carbon atoms and $n$ is an integer from 3 to 11 and from 50 to 10 percent by weight of a sodium alkyl sulfate containing from 8 to 18 carbon atoms in the molecule, the percent by weight being based on the total weight of the alkylphenyl polyethylene glycol ether and the alkali metal alkyl sulfate.

6. An article of manufacture comprising polystyrene film consisting of the polystyrene structure having a coating of an intimate mixture of from 50 to 90 percent by weight of an isooctylphenyl ether of a polyethylene glycol containing from 9 to 10 oxyethylene groups in the molecule and from 50 to 10 percent by weight of a sodium alkyl sulfate consisting essentially of the sodium sulfate derivative of 7-ethyl-2-methyl undecanol, and from 10 to 20 percent by weight of finely divided talc, all percentages being based on the sum of the weights of the isooctylphenyl ether and the sodium alkyl sulfate, said coating having a thickness between about 50 and about 500 Angstroms.

References Cited in the file of this patent

UNITED STATES PATENTS

| | | |
|---|---|---|
| 2,292,097 | Vollmer | Aug. 4, 1942 |
| 2,416,103 | Lampton et al. | Feb. 18, 1947 |
| 2,639,241 | Cornwall | May 19, 1953 |

FOREIGN PATENTS

| | | |
|---|---|---|
| 119,642 | Australia | Mar. 15, 1945 |